(12) United States Patent
Bunker et al.

(10) Patent No.: US 10,607,610 B2
(45) Date of Patent: Mar. 31, 2020

(54) AUDIO FIREWALL

(71) Applicant: Nortek Security & Control LLC, Carlsbad, CA (US)

(72) Inventors: Philip Alan Bunker, Vista, CA (US); Mayank Saxena, Pleasanton, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 0 days.

(21) Appl. No.: 15/991,809

(22) Filed: May 29, 2018

(65) Prior Publication Data

US 2019/0371337 A1 Dec. 5, 2019

(51) Int. Cl.
*G10L 15/00* (2013.01)
*G10L 15/26* (2006.01)
*G10L 13/04* (2013.01)
*G10L 15/30* (2013.01)
*G10L 15/22* (2006.01)

(52) U.S. Cl.
CPC .......... *G10L 15/265* (2013.01); *G10L 13/043* (2013.01); *G10L 15/22* (2013.01); *G10L 15/30* (2013.01); *G10L 2015/223* (2013.01)

(58) Field of Classification Search
CPC ........ G10L 15/00; G10L 15/20; G10L 15/26; G10L 15/30; G10L 2015/00; G10L 2015/06; G10L 2015/22; G10L 2015/223; G10L 2015/228
USPC ............ 704/273, 274, 275, 270.1, 231, 258
See application file for complete search history.

(56) References Cited

U.S. PATENT DOCUMENTS

| | | |
|---|---|---|
| 6,513,006 B2 | 1/2003 | Howard et al. |
| 7,464,035 B2 | 12/2008 | Funk et al. |
| 8,340,975 B1 | 12/2012 | Rosenberger |
| 8,527,278 B2 | 9/2013 | David |
| 8,718,047 B2 | 5/2014 | Vieri et al. |
| 8,751,832 B2 | 6/2014 | Cashin et al. |

(Continued)

FOREIGN PATENT DOCUMENTS

| | | |
|---|---|---|
| EP | 2930886 | 10/2015 |
| EP | 3156978 | 4/2017 |

(Continued)

OTHER PUBLICATIONS

Fahmeeda, Sayyada, "Audio Data Security and Feature Extraction over Cloud", Intl. Journal of Computer Applications, 168(10), (Jun. 2017), 5 pgs.

(Continued)

*Primary Examiner* — Qi Han
(74) *Attorney, Agent, or Firm* — Schwegman Lundberg & Woessner, P.A.

(57) ABSTRACT

An audio firewall system has a microphone that generates audio data. A speech-to-text engine converts the audio data to text data. The text data is parsed for a service wake word and corresponding content data. The service wake word identifies one of a local security system and a remote assistant server. A text-to-speech engine converts the service wake word and the corresponding content data to converted audio data. The converted audio data is provided to the remote assistant server. The content data is provided to the local security system. The audio firewall system receives a response from the remote assistant server or the local security system and outputs an audio signal corresponding to the response.

18 Claims, 9 Drawing Sheets

(56) References Cited

U.S. PATENT DOCUMENTS

| | | | |
|---|---|---|---|
| 9,230,560 | B2 | 1/2016 | Ehsani et al. |
| 9,318,108 | B2 | 4/2016 | Gruber et al. |
| 9,338,493 | B2 | 5/2016 | Van Os et al. |
| 9,699,317 | B1 | 7/2017 | Pycko et al. |
| 9,747,903 | B2 | 8/2017 | Kojima et al. |
| 10,127,911 | B2 * | 11/2018 | Kim ................ G10L 17/26 |
| 2015/0053780 | A1 | 2/2015 | Nelson et al. |
| 2015/0331666 | A1 | 11/2015 | Bucsa et al. |
| 2015/0348554 | A1 | 12/2015 | Orr et al. |
| 2016/0314782 | A1 | 10/2016 | Klimanis |
| 2016/0373909 | A1 * | 12/2016 | Rasmussen ......... H04L 41/0681 |
| 2016/0378080 | A1 | 12/2016 | Uppala et al. |
| 2017/0076720 | A1 | 3/2017 | Gopalan et al. |
| 2018/0108343 | A1 * | 4/2018 | Stevans ................ G10L 13/043 |
| 2019/0043514 | A1 * | 2/2019 | Maziewski ......... G10L 21/0208 |

FOREIGN PATENT DOCUMENTS

| | | |
|---|---|---|
| KR | 20050021694 | 3/2005 |
| WO | 2015148725 | 10/2015 |

OTHER PUBLICATIONS

Pubnub, "Building Voice-Controlled Home Automation with Amazon Alexa", Medium.com, [Online] Retrieved from the Internet on May 28, 2019: <URL: https://medium.com/@PubNub/building-voice-controlled-home-automation-with-amazon-alexa-dd8857a3608c>, (Apr. 26, 2017), 3 pgs.

Roemmele, Brian, "Google Home: The surprise of how it is and is not like Amazon Echo.", Medium.com, [Online] Retrieved from the internet on May 28, 2019: <URL: https://medium.com/@brianroemmele/google-home-the-surprise-of-how-it-is-and-is-not-like-amazon-echo-f0d6bf5fd14>, (May 19, 2016), 7 pgs.

Schoutsen, Paulus, "Introducing Home Assistant Cloud", Home Assistant Blog, [Online] Retrieved from the internet on May 28, 2019: <URL: https://www.home-assistant.io/blog/2017/12/17/introducing-home-assistant-cloud/>, (Dec. 17, 2017), 5 pgs.

Yakubu, M. Abukari, "Secure Audio Reverberation over Cloud", 10th Annual Symposium on Information Assurance (ASIA), Albany, NY, (Jun. 2015), 5 pgs.

* cited by examiner

US 10,607,610 B2

AUDIO FIREWALL

TECHNICAL FIELD

The subject matter disclosed herein generally relates to audio processing. Specifically, the present disclosure addresses systems and methods for filtering audio data from a local source to a remote server system.

BACKGROUND

Conventionally, a smart audio system continuously listens to audio in a household for a wake word (also known as a trigger word). When the smart audio system detects a preset wake word, the smart audio system generates a request to a corresponding remote server system. The smart audio system sends audio data produced by a microphone of the smart audio system to the remote server system for processing. However, the smart audio system can receive sensitive information that was not intended by the user to be sent to the remote server system. For example, the user may have spoken a word that sounds like the wake word. Sensitive information or data sent to the remote server system via a computer network can also be subject to eavesdropping by third parties.

BRIEF DESCRIPTION OF THE DRAWINGS

Some embodiments are illustrated by way of example and not limitation in the figures of the accompanying drawings.

DETAILED DESCRIPTION

Figure 1:
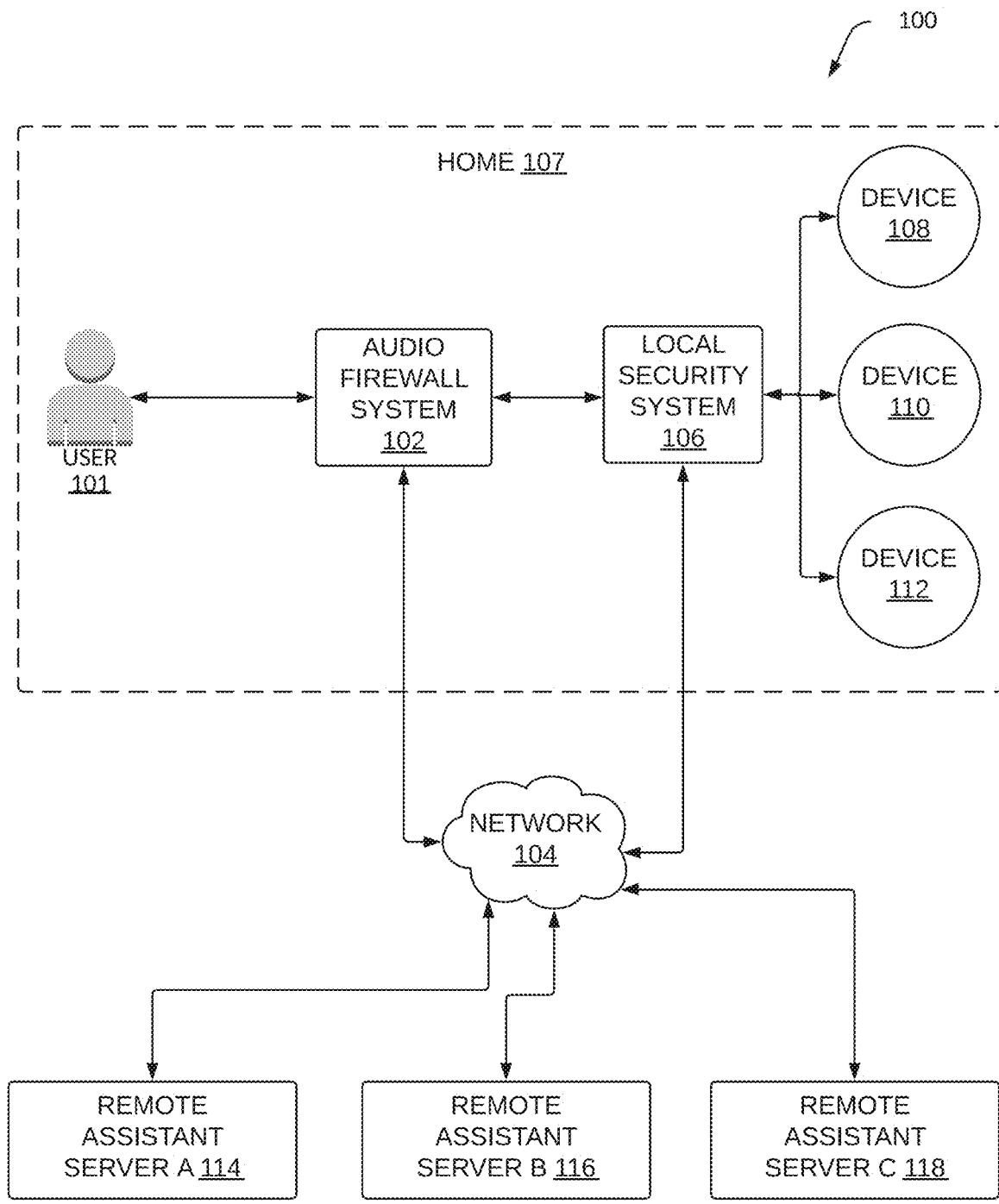
FIG. 1 is a block diagram illustrating an example environment for processing audio data in accordance with an example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) that determine whether content of an audio signal is to be processed locally at a local security system or is to be anonymized prior to sending the content of the audio signal to a remote assistant server are described. An audio firewall system controls what information is sent to a cloud service (referred to a remote assistant server). Control for home automation or security control via voice input is maintained at a local level. In other words, the audio firewall system detects a voice input in a home of a user, and processes the voice input to generate commands or requests to local control devices connected to a local security system at the home of the user. Therefore, the commands are processed locally without having to be transmitted outside the home of the user (e.g., over the Internet). The audio firewall system identifies the content of the voice input and determines that the user specifically submitted a request for a specific cloud service by detecting the wake word or trigger word associated with the cloud service in the content of the voice input. The audio firewall system generates an anonymized version of the content of the voice input and routes the anonymized content to the corresponding cloud service. Some cloud service sample a voice of the user to identify an identity of the user. The audio firewall system prevents the cloud service from identifying the user by anonymizing the voice of the user.

In accordance with example embodiments, an audio firewall system has a microphone that generates audio data. A speech-to-text engine converts the audio data to text data. The text data is parsed for a service wake word and corresponding content data. The service wake word identifies one of a local security system and a remote assistant server. A text-to-speech engine converts the service wake word and the corresponding content data to converted audio data. The converted audio data is provided to the remote assistant server. The content data is provided to the local security system. The audio firewall system receives a response from the remote assistant server or the local security system and outputs an audio signal corresponding to the response.

As a result, one or more of the methodologies described herein facilitate solving the technical problem of continuous monitoring of audio data by devices of cloud services. As such, one or more of the methodologies described herein may obviate a need for certain efforts or computing resources that otherwise would be involved in continuously sending information to cloud services over a public computer network (e.g., the Internet). As a result, resources used by one or more machines, databases, or devices may be reduced. Examples of such computing resources include processor cycles, network traffic, memory usage, data storage capacity, power consumption, network bandwidth, and cooling capacity.

FIG. 1 is a block diagram illustrating an example environment 100 for processing audio data in accordance with an example embodiment. In example embodiments, an audio firewall system 102 listens for an audio command from a user 101. The audio firewall system 102 determines whether the audio command is directed to a local security system 106 locally housed inside a home 107 of the user 101 or directed to a cloud service (e.g., remote assistant server A 114) outside the home 107. The audio firewall system 102 will be discussed in more detail in connection with FIG. 2 below.

The audio firewall system 102 may be connected to the local security system 106, for example, via a (wired or wireless) local computer network. The local security system 106 includes a system for home security and automation. For example, the local security system 106 is connected to devices 108, 110, 112. Examples of devices include a switch, a thermostat, an alarm, other control devices, and other sensor devices. The devices 108, 110, 112 are placed inside the home 107. In one example embodiment, the audio firewall system 102 receives from the user 101 an audio signal that indicates a request to control the device 108. The audio firewall system 102 sends the request to the local security system 106 to locally process the request to control the device 108 (without having to send the request over a network 104 (e.g., the Internet)). In another example embodiment, the audio firewall system 102 receives from the user 101 an audio signal that indicates a wake word and a request. The audio firewall system 102 identifies the cloud service (e.g., remote assistant server A 114) associated with the wake word. The audio firewall system 102 anonymizes the request by modifying properties of the audio signal (e.g., pitch, speed, voice morphing, or other audio modifications), converting the audio signal to text, and converting the text back to an audio version. The audio firewall system 102 sends the audio version to the remote assistant server A 114 over the network 104 (e.g., the Internet) for remote processing. The audio firewall system 102 receives a response back from the remote assistant server A 114 and generates an audio signal representing the response (e.g., "Today's forecast calls for a sunny sky").

The audio firewall system 102 and the local security system 106 are coupled, via a network 104, to one or more cloud services (e.g., remote assistant server A 114, remote assistant server B 116, remote assistant server C 118). The cloud services provide information in response to a request from the user 101. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The audio firewall system 102 comprises, but is not limited to, a smartphone, tablet, laptop, multi-processor system, microprocessor-based or programmable consumer electronics system, game console, set-top box, or any other device that a user utilizes to communicate over the network 104. In example embodiments, the audio firewall system 102 comprises a display module (not shown) to display information (e.g., in the form of specially configured user interfaces, or in the form of a web browser). In some embodiments, the audio firewall system 102 may comprise one or more of a touch screen, camera, keyboard, microphone, and Global Positioning System (GPS) device.

Any of the systems or machines (e.g., databases, devices, or servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 9, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of audio firewall system 102 may be embodied within the environment 100. Furthermore, some components or functions of the environment 100 may be combined or located elsewhere in the environment 100. For example, some of the functions of the audio firewall system 102 may be embodied at the local security system 106.

Figure 2:
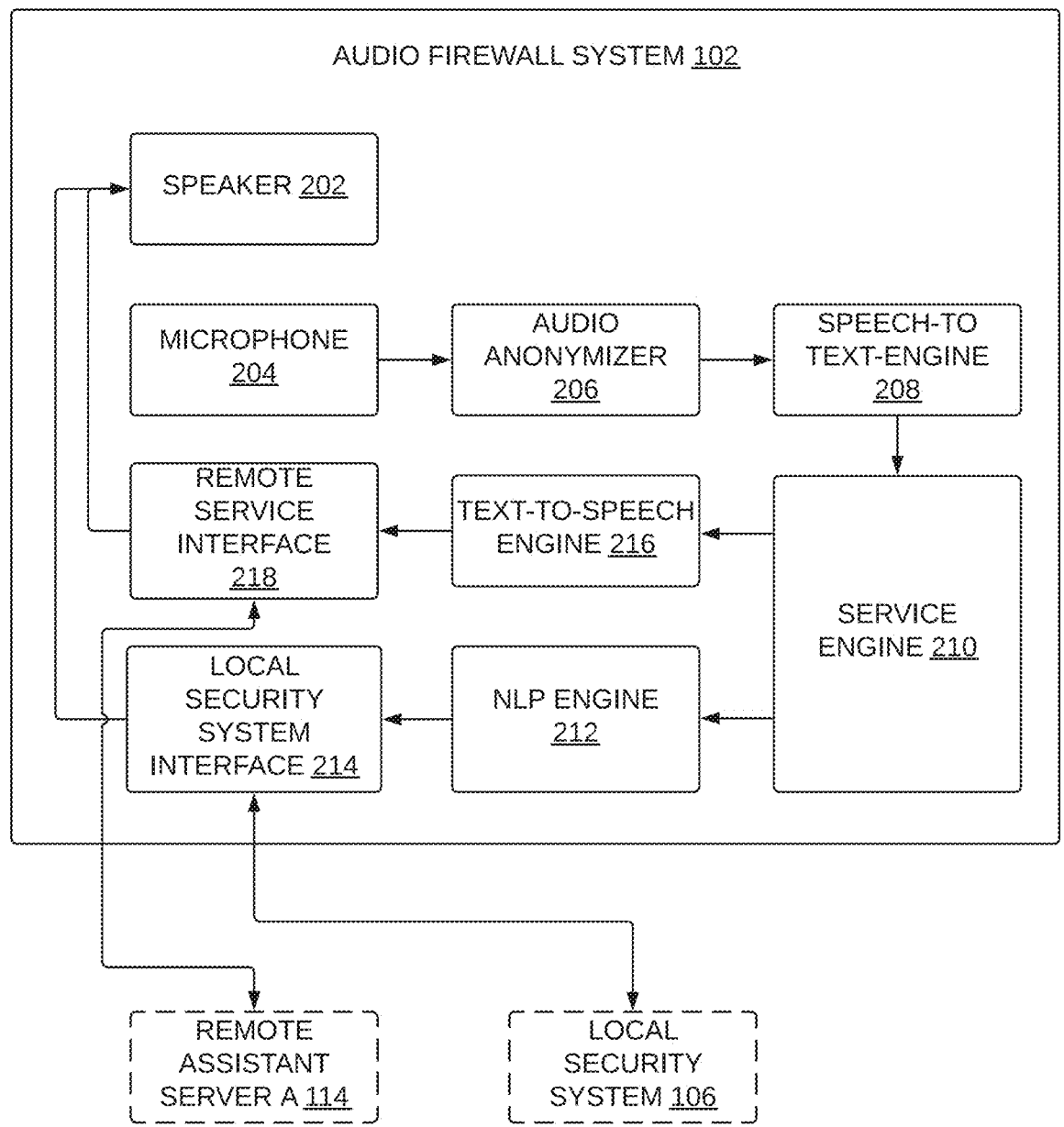
FIG. 2 is a block diagram illustrating components within an audio firewall system in accordance with an example embodiment.

FIG. 2 is a block diagram illustrating components within the audio firewall system 102 in accordance with an example embodiment. In example embodiments, the audio firewall system 102 performs operations to determine whether to process a request locally using the local security system 106 or to send an anonymized version of content of the request to a corresponding cloud service identified in the request. To enable these operations, the audio firewall system 102 comprises a speaker 202, a microphone 204, an audio anonymizer 206, a speech-to-text engine 208, a service engine 210, a natural language processor (NLP) engine 212, a local security system interface 214, a text-to-speech engine 216, and a remote service interface 218 (e.g., application programming Interface (API)), all of which are configured to communicate with each other (e.g., over a bus, shared memory, or a switch) in accordance with an example embodiment.

The microphone 204 generates audio data based on an audio signal from the user 101 (e.g., "Computer, what's the weather today?" or "Security, disarm my doors"). In one example embodiment, the microphone 204 continuously detects the audio signal and communicates the audio data to the audio anonymizer 206. In another example embodiment, the microphone 204 communicates the audio data directly to the speech-to-text engine 208 (bypassing the audio anonymizer 206).

The audio anonymizer 206 modifies properties of the audio data. For example, the audio anonymizer 206 changes the pitch or speed of the voice to render the voice of the user 101 anonymous. Other types of changes may be applied to the audio data to change the voice of the user 101. In other example embodiments, the audio anonymizer 206 filters out portions of the frequency spectrum from the audio data to remove background noise (e.g., rumbling, train noise, lighthouse horn) to prevent context from being determined from the audio data.

The speech-to-text engine 208 converts the audio data into text data. For example, the speech-to-text engine 208 can include a conventional speech-to-text algorithm. In one example embodiment, the user 101 sets the audio firewall system 102 to a specific language (e.g., English) so that the relevant speech-to-text engine (e.g., English speech-to-text engine) is loaded. In another example embodiment, the speech-to-text engine 208 continuously converts the audio data into text data. In yet another example embodiment, the speech-to-text engine 208 converts the audio data into text data based on predefined conditions (e.g., the audio firewall system 102 detects that the user 101 is home, the speech-to-text engine 208 operates during business hours). The speech-to-text engine 208 provides the text data to the service engine 210.

The service engine 210 parses the text data to look for a preset wake word. The preset wake word may be defined and provided by the cloud services and the local security system 106. The service engine 210 determines whether the wake word is associated with or identifies a cloud service (e.g., remote assistant server A 114) or a local security system 106. Each cloud service is associated with a corresponding wake word. For example, the wake word for the remote assistant server A 114 is "Orange." The wake word for the remote assistant server B 116 is "Banana."

In one example embodiment, the audio firewall system 102 can be configured to enable the user 101 to change and customize the wake word for the local security system 106. For example, the user 101 can change the wake word "Security" to "Home" for the local security system 106.

In another example embodiment, the service engine 210 can be configured to enable the user 101 to change and customize a single wake word for the local security system 106 and the cloud services. For example, instead of saying, "Computer, what's the weather?" and "Security, disarm my alarm," the user 101 can say, "Jarvis, what's the weather?" and "Jarvis, disarm my alarm." The service engine 210 parses the text data to look for the custom wake word (e.g., "Jarvis") and identify the request ("What's the weather?" or "Disarm my alarm"). In one example, the service engine 210 detects the word "alarm" and processes the request locally at the local security system 106. If the service engine 210 does not recognize key terms (in the request) that are associated with any of the devices 108, 110, 112 or the local security system 106, the service engine 210 forwards the request to one of the cloud services (e.g., the selected cloud service may be rotated since all of the cloud services are capable of providing weather information). Therefore, the user 101 has the option to combine all services from the cloud services and the local security system 106 into the audio firewall system 102 by using one wake word (e.g., a master wake word instead of an individual wake word for each cloud service).

Once the service engine 210 identifies the wake word (e.g., "computer"), the service engine 210 determines the corresponding content data (e.g., the request portion "turn on the light") following the wake word from the text data. The service engine 210 subsequently processes the content data based on the wake word.

In one example embodiment, if the wake word identifies the cloud service of the remote assistant server A 114, the service engine 210 sends the wake word and the content data (from the text data) to the text-to-speech engine 216. The text-to-speech engine 216 converts both the wake word and the content data to converted audio data (e.g., spoken form) and communicates the converted audio data to the remote service interface 218.

The remote service interface 218 steers the converted audio data to the corresponding cloud service (e.g., remote assistant server A 114) based on the wake word (e.g., "computer"). In one example embodiment, the service engine 210 generates a cloud service tag (e.g., "remote assistant server A") based on the identified wake word (e.g., "computer") and provides the cloud service tag to the remote service interface 218. For example, if the cloud service tag is "remote assistant server A," the remote service interface 218 forwards the audio data to the remote assistant server A 114 for processing. The remote service interface 218 then receives a response from the remote assistant server A 114. The remote service interface 218 provides the response to the speaker 202, which generates an audio signal corresponding to the response (e.g., "Today, the weather is sunny").

In one example embodiment, if the wake word identifies the local security system 106, the service engine 210 sends the content data (from the text data) with or without the wake word to the NLP engine 212. The NLP engine 212 analyzes the content data to recognize predefined commands or requests and provides the commands or requests to the local security system interface 214. The local security system interface 214 communicates the commands/requests to the local security system 106. The local security system interface 214 then receives a response from the local security system 106. The local security system interface 214 provides the response to the speaker 202, which generates an audio signal corresponding to the response (e.g., "The house alarm is armed"). In another example embodiment, the audio firewall system 102 is part of the local security system 106.

Any one or more of the components (e.g., modules, engines) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that component. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. The audio firewall system 102 may comprise other components not pertinent to example embodiments that are not shown or discussed. Further still, one or more of the components of the audio firewall system 102 may be located at the local security system 106 or in another device located at the home 107 of the user 101.

Figure 3:
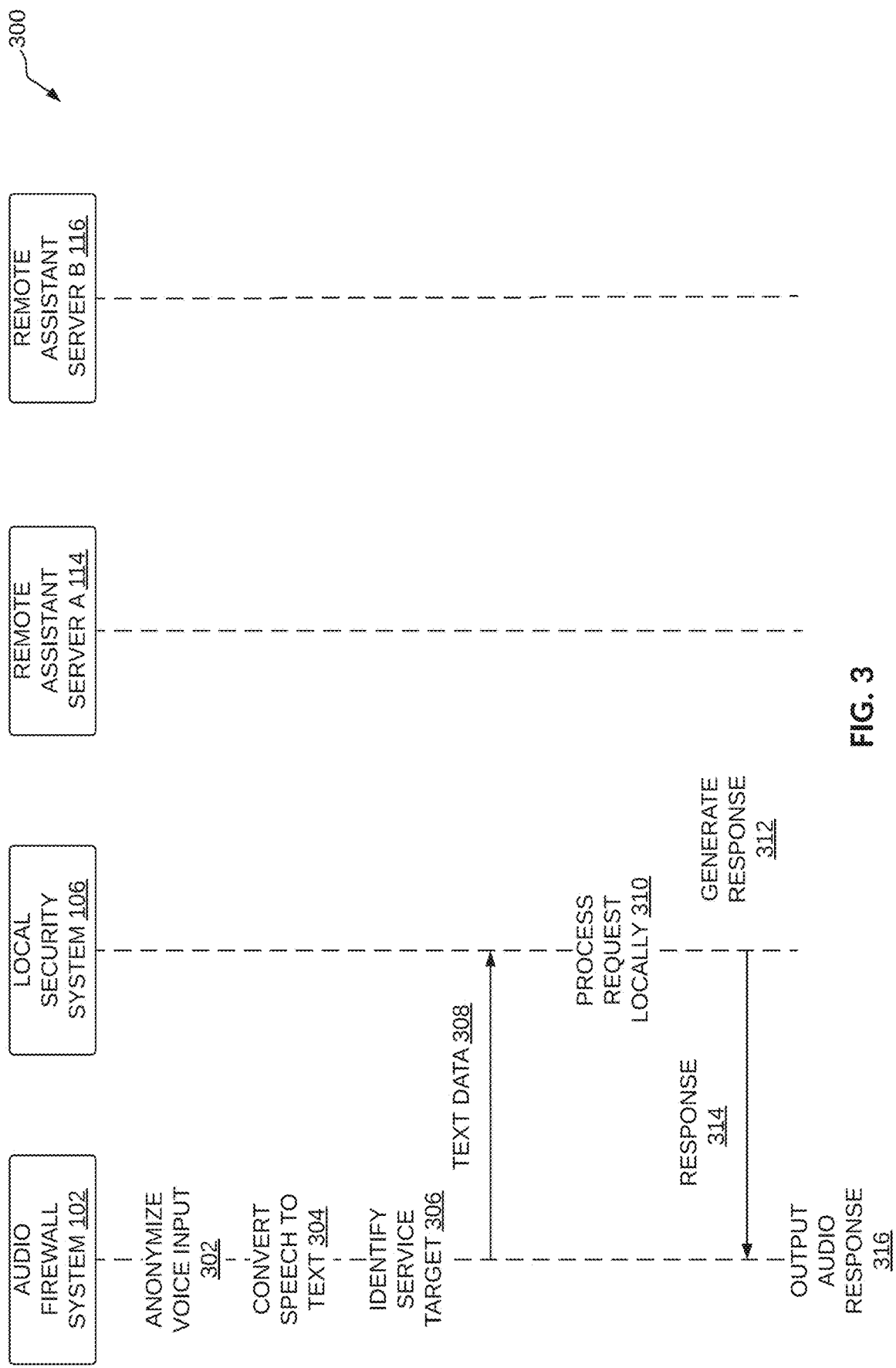
FIG. 3 is a block diagram illustrating interactions between components in accordance with an example embodiment.

FIG. 3 is a block diagram illustrating interactions 300 between components in accordance with an example embodiment. At operation 302, the audio firewall system 102 receives a voice input from the user 101 and anonymizes the voice input. At operation 304, the audio firewall system 102 converts the voice input to text data. At operation 306, the audio firewall system 102 identifies a service target (e.g., using a wake word or a cloud service tag) based on the wake word in the text data. For example, the audio firewall system 102 determines that the wake word is associated with the local security system 106. At operation 308, the audio firewall system 102 sends the text data to the local security system 106. At operation 310, the local security system 106 processes the request locally. At operation 312, the local security system 106 generates and sends a device response 314 to the audio firewall system 102. At operation 316, the audio firewall system 102 outputs an audio response corresponding to the device response 314.

Figure 4:
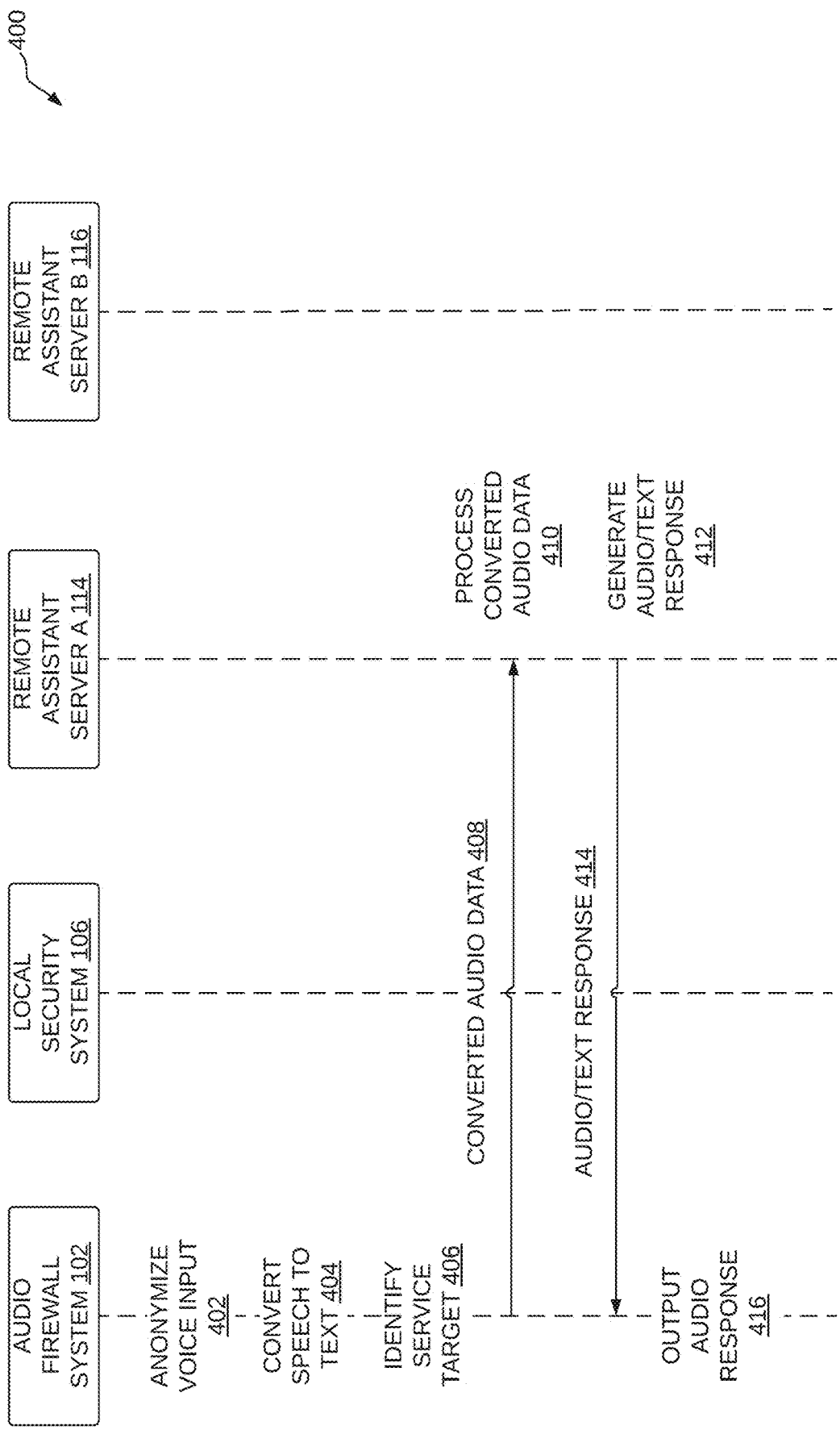
FIG. 4 is a block diagram illustrating interactions between components in accordance with another example embodiment.

FIG. 4 is a block diagram illustrating interactions 400 between components in accordance with another example embodiment. At operation 402, the audio firewall system 102 receives a voice input from the user 101 and anonymizes the voice input. At operation 404, the audio firewall system 102 converts the voice input to text data. At operation 406, the audio firewall system 102 identifies a service target (e.g., using a wake word or a cloud service tag) based on the wake word in the text data. For example, the audio firewall system 102 determines that the wake word is associated with the remote assistant server A 114. At operation 408, the audio firewall system 102 sends converted audio data based on the text data to the remote assistant server A 114. At operation 410, the remote assistant server A 114 processes the converted audio data. At operation 412, the remote assistant server A 114 generates an audio/text response. At operation 414, the remote assistant server A 114 sends the audio/text response to the audio firewall system 102. At operation 416, the audio firewall system 102 outputs an audio response corresponding to the audio/text response.

Figure 5:
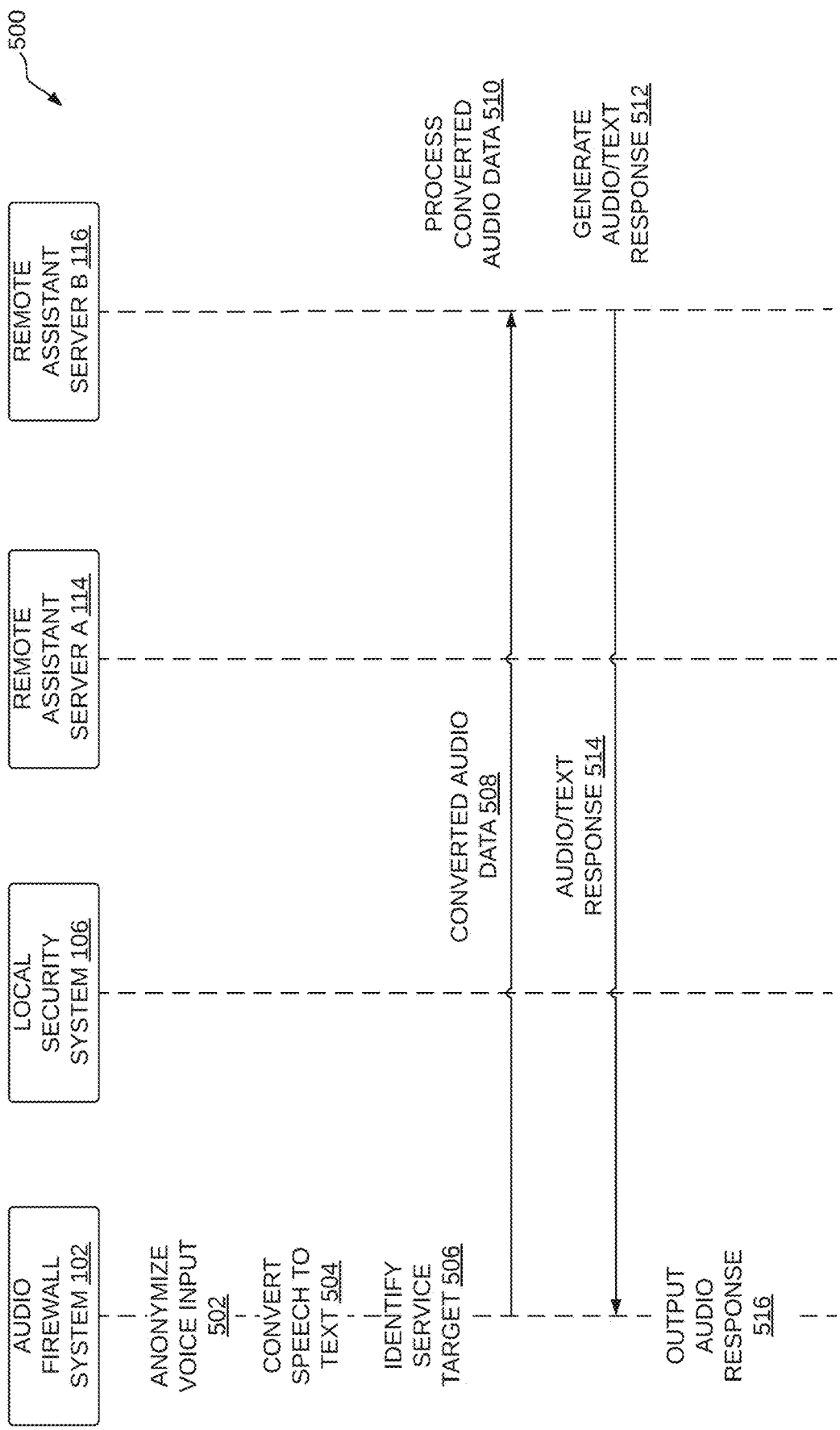
FIG. 5 is a block diagram illustrating interactions between components in accordance with another example embodiment.

FIG. 5 is a block diagram illustrating interactions 500 between components in accordance with another example embodiment. At operation 502, the audio firewall system 102 receives a voice input from the user 101 and anonymizes the voice input. At operation 504, the audio firewall system 102 converts the voice input to text data. At operation 506, the audio firewall system 102 identifies a service target (e.g., using a wake word or a cloud service tag) based on the wake word in the text data. For example, the audio firewall system 102 determines that the wake word is associated with the remote assistant server B 116. At operation 508, the audio firewall system 102 sends converted audio data based on the text data to the remote assistant server B 116. At operation 510, the remote assistant server B 116 processes the converted audio data. At operation 512, the remote assistant server B 116 generates an audio/text response. At operation 514, the remote assistant server B 116 sends the audio/text response to the audio firewall system 102. At operation 516, the audio firewall system 102 outputs an audio response corresponding to the audio/text response.

Figure 6:
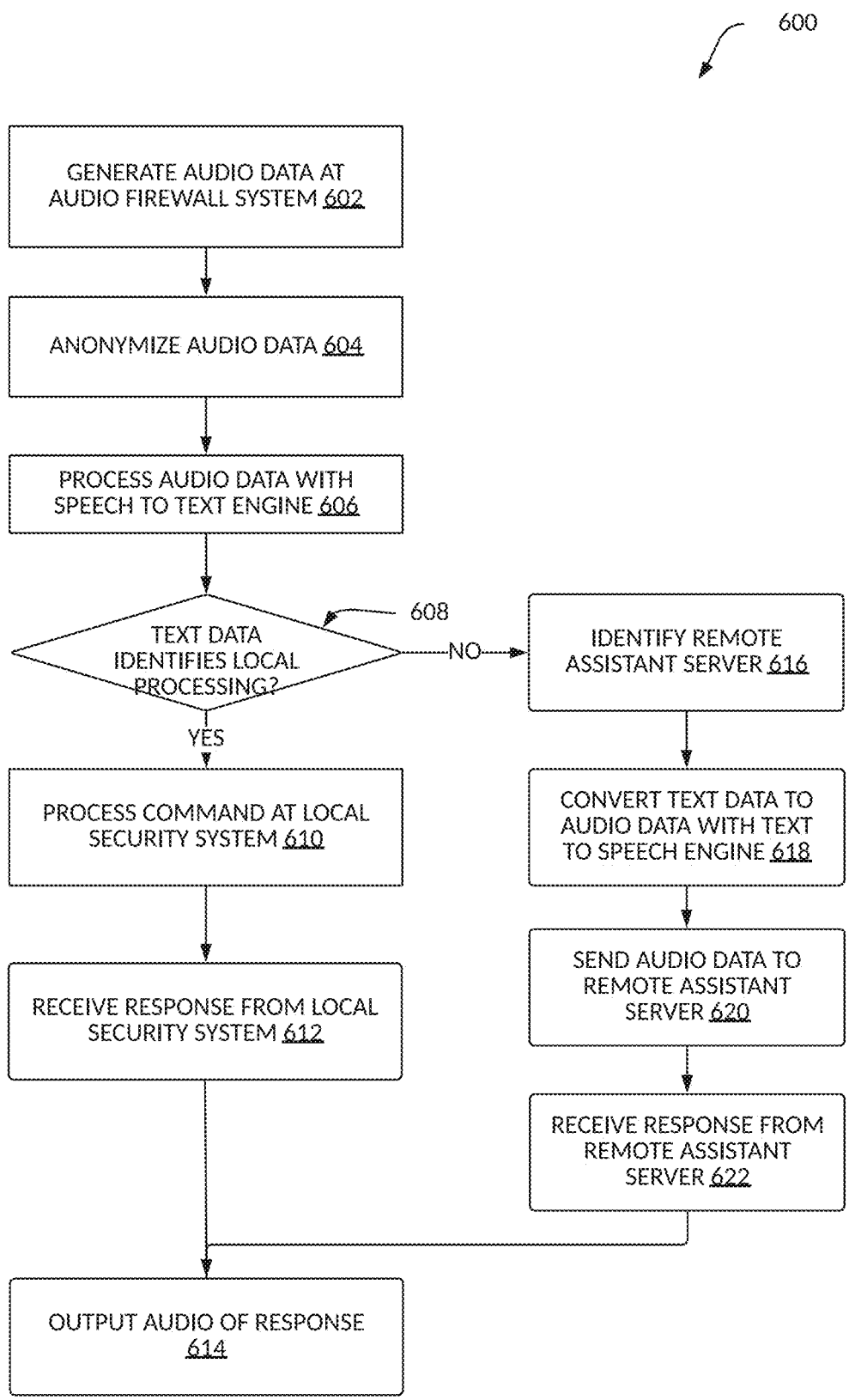
FIG. 6 is a flow diagram of a method for processing audio data in accordance with an example embodiment.

FIG. 6 is a flow diagram of a method 600 for processing audio data in accordance with an example embodiment. Operations in the method 600 may be performed by the audio firewall system 102, using components (e.g., modules, engines) described above with respect to FIG. 2. Accordingly, the method 600 is described by way of example with reference to the audio firewall system 102. However, it shall be appreciated that at least some of the operations of the method 600 may be deployed on various other hardware configurations or be performed by similar components residing elsewhere. For example, some of the operations may be performed at the local security system 106.

At operation 602, the microphone 204 generates audio data based on an audio signal detected by the microphone 204. At operation 604, the audio anonymizer 206 changes characteristics of the audio data/signal to render the voice of the user 101 anonymous. At operation 606, the speech-to-text engine 208 processes the audio data to convert the audio data to text data. At operation 608, the service engine 210 determines whether the text data identifies the local security system 106 by using a wake word associated with the local security system 106.

If the service engine 210 determines that the text data identifies the local security system 106, the service engine 210 provides the text data to be processed to the local security system 106 at operation 610. At operation 612, the local security system interface 214 receives a response from the local security system 106. At operation 614, the speaker 202 generates an audio output corresponding to the response.

If at operation 608 the service engine 210 determines whether the text data identifies the local security system 106 (or in another embodiment, whether the text data identifies a cloud service), the service engine 210 identifies the remote assistant server associated with the wake word in the text data at operation 616. At operation 618, the text-to-speech engine 216 converts the text data to audio data. At operation 620, the remote service interface 218 sends the converted audio data to the corresponding remote assistant server. At operation 622, the remote service interface 218 receives a response from the remote assistant server. At operation 614, the speaker 202 generates an audio output corresponding to the response.

Figure 7:
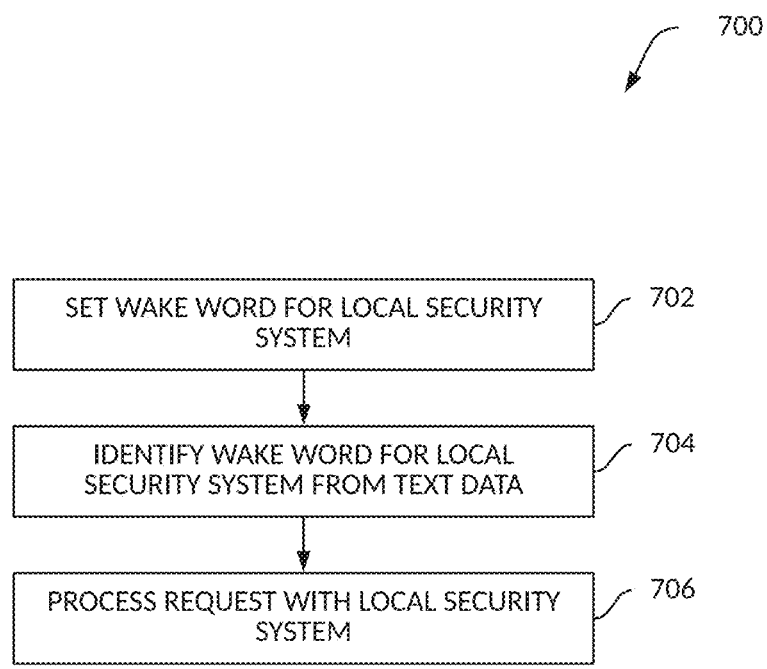
FIG. 7 is a flow diagram of a method for processing audio data at a local security system in accordance with an example embodiment.

FIG. 7 is a flow diagram of a method for processing audio data at a local security system in accordance with an example embodiment. Operations in the method 700 may be performed by the audio firewall system 102, using components (e.g., modules, engines) described above with respect to FIG. 2. Accordingly, the method 700 is described by way of example with reference to the audio firewall system 102. However, it shall be appreciated that at least some of the operations of the method 700 may be deployed on various other hardware configurations or be performed by similar components residing elsewhere. For example, some of the operations may be performed at the local security system 106.

At operation 702, the service engine 210 sets a wake word for the local security system 106. At operation 704, the service engine 210 identifies the wake word for the local security system 106 from text data. At operation 706, the local security system 106 processes a request in the text data.

Figure 8:
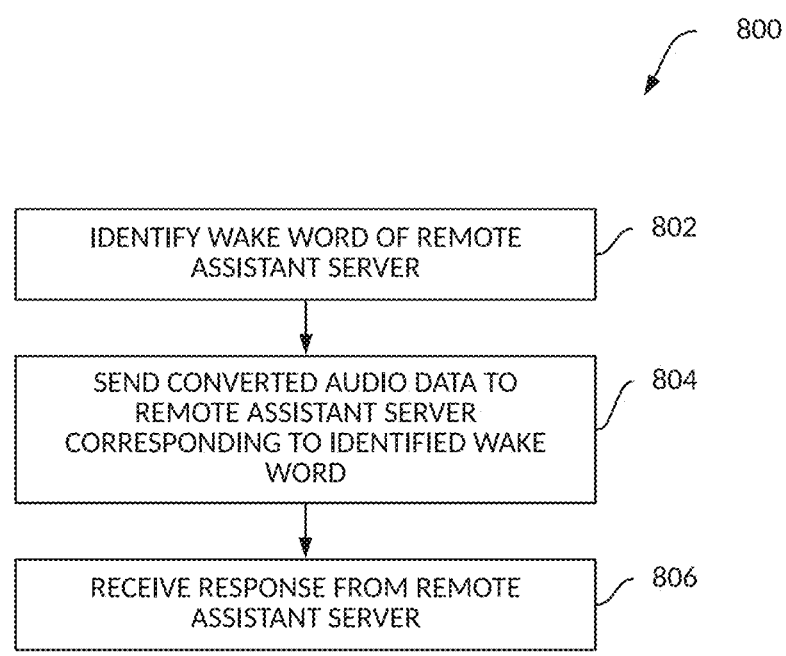
FIG. 8 is a flow diagram of a method for processing audio data at a remote assistant server in accordance with an example embodiment.

FIG. 8 is a flow diagram of a method for processing audio data at a remote assistant server in accordance with an example embodiment. Operations in the method 800 may be performed by the audio firewall system 102, using components (e.g., modules, engines) described above with respect to FIG. 2. Accordingly, the method 800 is described by way of example with reference to the audio firewall system 102. However, it shall be appreciated that at least some of the operations of the method 800 may be deployed on various other hardware configurations or be performed by similar components residing elsewhere. For example, some of the operations may be performed at the local security system 106.

At operation 802, the service engine 210 identifies the wake word of a remote assistant server. At operation 804, the service engine 210 sends converted audio data to the remote assistant server corresponding to the identified wake word. At operation 806, the service engine 210 receives a response from the remote assistant server.

Figure 9:
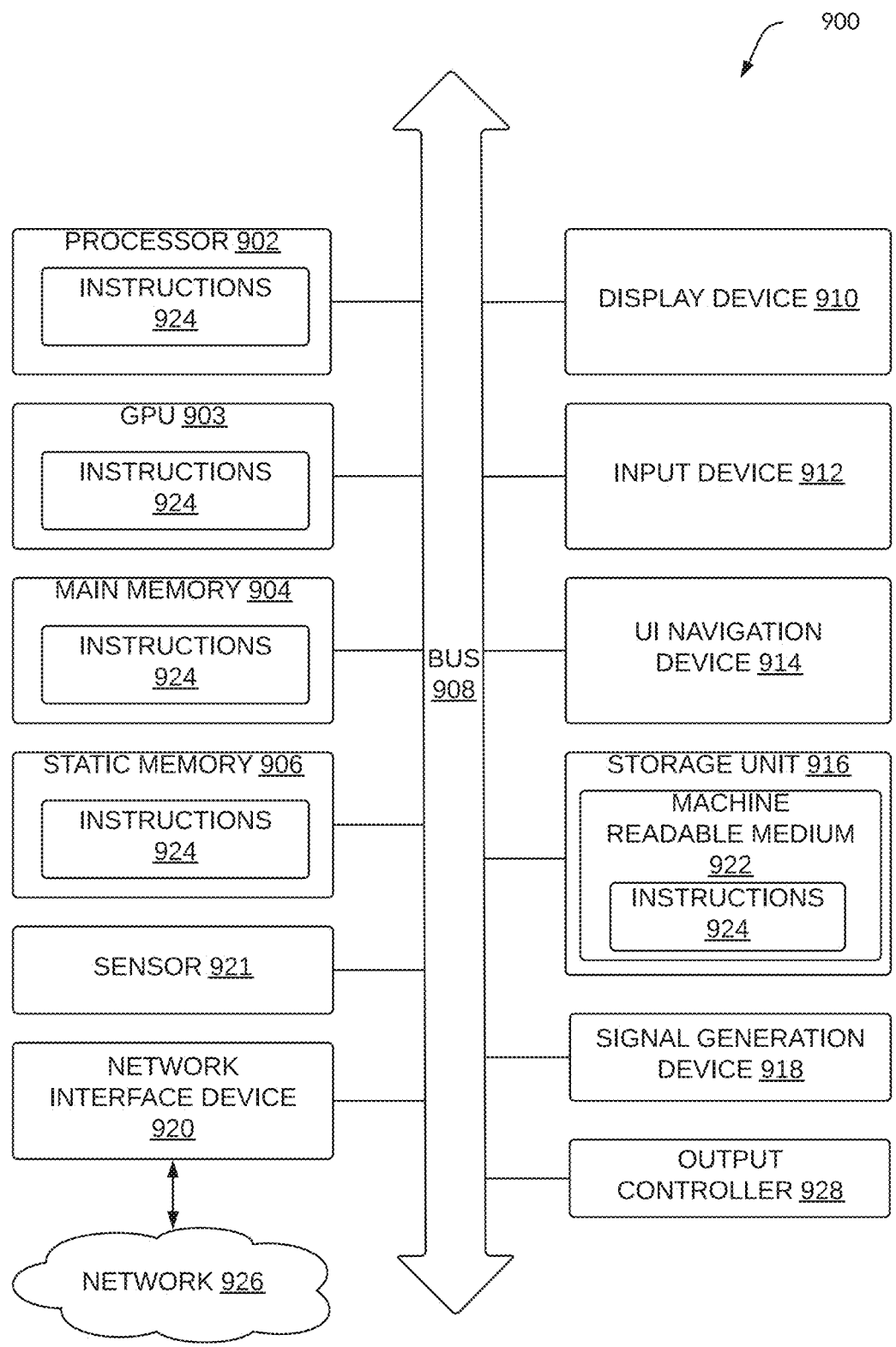
FIG. 9 is a diagrammatic representation of a machine in an example form of a computing system within which a set of instructions may be executed for causing the machine to perform any one or more of the methodologies discussed herein, according to an example embodiment.

FIG. 9 is a block diagram illustrating components of a machine 900, according to some example embodiments, able to read instructions 924 from a machine-readable medium 922 and perform any one or more of the methodologies discussed herein, in whole or in part. Specifically, FIG. 9 shows the machine 900 in the example form of a computer device (e.g., a computer) within which the instructions 924 (e.g., software, a program, an application, an applet, an app, or other executable code) for causing the machine 900 to perform any one or more of the methodologies discussed herein may be executed, in whole or in part.

For example, the instructions 924 may cause the machine 900 to execute the flows and flow diagrams of FIGS. 6, 7, and 8. The instructions 924 can transform the general, non-programmed machine 900 into a particular machine (e.g., specially configured machine) programmed to carry out the described and illustrated functions in the manner described.

In alternative embodiments, the machine 900 operates as a standalone device or may be connected (e.g., networked) to other machines. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, or any machine 900 capable of executing the instructions 924, sequentially or otherwise, that specify actions to be taken by that machine 900. Further, while only a single machine 900 is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a digital signal processor (DSP), an application specific integrated circuit (ASIC), a radio-frequency integrated circuit (RFIC), or any suitable combination thereof), a graphics processing unit (GPU) 903, a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a display device 910 (e.g., a plasma display panel (PDP), a light-emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a user interface (UI) navigation device 914 (e.g., a mouse, a touchpad, a trackball, a joystick, a motion sensor, an eye tracking device, or another pointing instrument), a storage unit 916, a signal generation device 918 (e.g., a sound card, an amplifier, a speaker, a headphone jack, or any suitable combination thereof), a network interface device 920, and one or more sensors 921, such as a Global Positioning System (GPS) sensor, compass, accelerometer, or another sensor. The machine 900 may include an output controller 928, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage unit 916 includes the machine-storage medium 922 on which are stored the instructions 924 embodying any one or more of the methodologies or functions described herein. The instructions 924 may also reside, completely or at least partially, within the processor 902, the GPU 903, main memory 904, the static memory 906, or the machine-storage medium 922 before or during execution thereof by the machine 900. Accordingly, the main memory 904, the static memory 906, the GPU 903, and the processor 902 may be considered machine-readable medium 922 (e.g., tangible and non-transitory machine-readable media).

In some example embodiments, the machine 900 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 904, 906, and/or the memory of the processor(s) 902, 903) and/or the storage unit 916 may store one or more sets of instructions 924 and data structures (e.g., software) embodying or utilized by any one or more of the methodologies or functions described herein. These instructions, when executed by the processor(s) 902, cause various operations to implement the disclosed embodiments.

As used herein, the terms "machine-storage medium," "device-storage medium," and "computer-storage medium" (referred to collectively as "machine-storage medium 922") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 922 include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The instructions 924 may further be transmitted or received over a communication network 926 using a transmission medium via the network interface device 920 and utilizing any one of a number of well-known transfer protocols (e.g., Hypertext Transfer Protocol (HTTP)). Examples of communication networks 926 include a local area network (LAN), a wide area network (WAN), the Internet, mobile telephone networks, plain old telephone service (POTS) networks, and wireless data networks (e.g., Wi-Fi, Long-Term Evolution (LTE), and WiMAX networks). The term "transmission medium" or "signal medium" shall be taken to include any intangible medium that is capable of storing, encoding, or carrying the instructions 924 for execution by the machine 900, and includes digital or analog communications signals or other intangible media to facilitate communication of such software.

Certain embodiments are described herein as including logic or a number of components, modules, or mechanisms. Modules may constitute either software modules (e.g., code embodied on a machine-storage medium 922 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 902 or a group of processors 902) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Examples

Example 1 is an audio firewall system comprising: a microphone configured to generate audio data; a speech-to-text engine configured to convert the audio data to text data; a service engine configured to parse the text data for a service wake word and corresponding content data, the service wake word identifying one of a local security system and a remote assistant server; a text-to-speech engine configured to convert the service wake word and the corresponding content data to converted audio data; a remote service interface configured to provide the converted audio data to the remote assistant server; and a local security system interface configured to provide the content data to the local security system.

In example 2, the subject matter of example 1 can optionally include wherein the remote service interface is configured to receive a response from the remote assistant server in response to providing the converted audio data to the remote assistant server, and further comprising: a speaker configured to output an audio signal corresponding to the response.

In example 3, the subject matter of example 1 can optionally include wherein the local security system interface is configured to receive a response from the local security system in response to providing the content data to the local security system, and further comprising: a speaker configured to output an audio signal corresponding to the response.

In example 4, the subject matter of example 1 can optionally include an audio anonymizer coupled between the microphone and the speech-to-text engine, the audio anonymizer configured to adjust at least one of a pitch and a speed of the audio data, and to provide the adjusted audio data to the speech-to-text engine.

In example 5, the subject matter of example 1 can optionally include wherein the service engine is configured to identify the service wake word, and to identify the remote assistant server from a plurality of remote assistant servers, the remote assistant server corresponding to the service wake word, each remote assistant server identified with a corresponding service wake word.

In example 6, the subject matter of example 1 can optionally include wherein the service engine is configured to identify the service wake word, and to identify the local security system corresponding to the service wake word.

In example 7, the subject matter of example 5 can optionally include wherein the service engine is configured to receive a custom service wake word, to determine that the custom service wake word is different from the plurality of service wake words from the plurality of remote assistant servers, and to associate the custom service wake word with the local security system in response to determining that the custom service wake word is different from the plurality of service wake words.

In example 8, the subject matter of example 1 can optionally include wherein the corresponding content data includes a request for the remote assistant server, wherein the remote service interface is configured to receive a response from the remote assistant server in response to the request.

In example 9, the subject matter of example 1 can optionally include wherein the remote service interface is configured to communicate with a plurality of remote assistant servers, each remote assistant server having a corresponding service wake word.

In example 10, the subject matter of example 1 can optionally include further comprising: the local security system configured to receive the content data, to identify a device connected to the local security system based on the content data, to generate a command to the device based on the content data, and to receive a response from the device; and a speaker configured to generate an audio signal corresponding to the response from the device.

Although an overview of the present subject matter has been described with reference to specific example embodiments, various modifications and changes may be made to these embodiments without departing from the broader scope of embodiments of the present disclosure. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An audio firewall system comprising:
a microphone configured to generate audio data;
a speech-to-text engine configured to convert the audio data to text data prior to detecting a service wake word;
a service engine configured to detect the service wake word in the text data after parsing the text data for the service wake word and corresponding content data, the service wake word identifying one of a local security system and a remote assistant server;
a text-to-speech engine configured to convert the text data comprising the service wake word and the corresponding content data to converted audio data;
an audio anonymizer coupled between the microphone and the speech-to-text engine, the audio anonymizer configured to adjust at least one of a pitch and a speed of the audio data, and to provide the adjusted audio data to the speech-to-text engine;
a remote service interface configured to provide the converted audio data to the remote assistant server; and
a local security system interface configured to provide the content data to the local security system.

2. The audio firewall system of claim 1, wherein the remote service interface is configured to receive a response from the remote assistant server in response to providing the converted audio data to the remote assistant server, and further comprising:
a speaker configured to output an audio signal corresponding to the response.

3. The audio firewall system of claim 1, wherein the local security system interface is configured to receive a response from the local security system in response to providing the content data to the local security system, and further comprising:
a speaker configured to output an audio signal corresponding to the response.

4. The audio firewall system of claim 1, wherein the service engine is configured to identify the service wake word from a plurality of service wake words, and to identify the remote assistant server from a plurality of remote assistant servers, the remote assistant server corresponding to the service wake word, each remote assistant server identified with a corresponding service wake word.

5. The audio firewall system of claim 4, wherein the service engine is configured to receive a custom service wake word, to determine that the custom service wake word is different from the plurality of service wake words from the plurality of remote assistant servers, and to associate the custom service wake word with the local security system in response to determining that the custom service wake word is different from the plurality of service wake words.

6. The audio firewall system of claim 1, wherein the service engine is configured to identify the service wake word, and to identify the local security system corresponding to the service wake word.

7. The audio firewall system of claim 1, wherein the corresponding content data includes a request for the remote assistant server, wherein the remote service interface is configured to receive a response from the remote assistant server in response to the request.

8. The audio firewall system of claim 1, wherein the remote service interface is configured to communicate with a plurality of remote assistant servers, each remote assistant server having a corresponding service wake word.

9. The audio firewall system of claim 1, wherein the local security system is configured to receive the content data, to identify a device connected to the local security system based on the content data, to generate a command to the device based on the content data, and to receive a response from the device, and
wherein the audio firewall system further comprises a speaker configured to generate an audio signal corresponding to the response from the device.

10. A method comprising:
generating audio data with a microphone of an audio firewall system;
converting the audio data to text data with a speech-to-text engine prior to detecting a service wake word;
detecting the service wake word in the text data after parsing the text data for the service wake word and corresponding content data, the service wake word identifying one of a local security system and a remote assistant server;
converting the text data comprising the service wake word and the corresponding content data to converted audio data using a text-to-speech engine;
adjusting at least one of a pitch and a speed of the audio data;
providing the adjusted audio data to the speech-to-text engine;
providing the converted audio data to the remote assistant server; and
providing the content data to the local security system.

11. The method of claim 10, further comprising:
receiving a response from the remote assistant server in response to providing the converted audio data to the remote assistant server; and
outputting an audio signal corresponding to the response with a speaker at the audio firewall system.

12. The method of claim 10, further comprising:
receiving a response from the local security system in response to providing the content data to the local security system; and
outputting an audio signal corresponding to the response with a speaker at the audio firewall system.

13. The method of claim 10, further comprising:
identifying the service wake word from a plurality of service wake words, in the text data; and
identifying the remote assistant server from a plurality of remote assistant servers, the remote assistant server corresponding to the service wake word, each remote assistant server identified with a corresponding service wake word.

14. The method of claim 13, further comprising:
receiving a custom service wake word;
determining that the custom service wake word is different from the plurality of service wake words from the plurality of remote assistant servers; and
associating the custom service wake word with the local security in response to determining that the custom service wake word is different from the plurality of service wake words.

15. The method of claim 10, further comprising:
identifying the service wake word; and
identifying the local security system corresponding to the service wake word.

16. The method of claim 10, wherein the audio firewall system is configured to communicate with a plurality of remote assistant servers, each remote assistant server having a corresponding service wake word.

17. The method of claim 10, further comprising:
identifying a device connected to the local security system based on the content data;
generating a command to the device based on the content data;
receiving a response from the device; and
generating an audio signal corresponding to the response from device.

18. A machine-storage medium storing instructions that, when executed by one or more processors of a machine, cause the one or more processors to perform operations comprising:
generating audio data with a microphone of an audio firewall system;
converting the audio data to text data prior to detecting a service wake word;
detecting the service wake word in the text data after parsing the text data for the service wake word and corresponding content data, the service wake word identifying one of a local security system and a remote assistant server;
converting the text data comprising the service wake word and the corresponding content data to converted audio data using a text-to-speech engine;
adjusting at least one of a pitch and a speed of the audio data;
providing the adjusted audio data to the speech-to-text engine;
providing the converted audio data to the remote assistant server; and
providing the content data to the local security system.

* * * * *

UNITED STATES PATENT AND TRADEMARK OFFICE
CERTIFICATE OF CORRECTION

PATENT NO. : 10,607,610 B2
APPLICATION NO. : 15/991809
DATED : March 31, 2020
INVENTOR(S) : Bunker et al.

Page 1 of 1

It is certified that error appears in the above-identified patent and that said Letters Patent is hereby corrected as shown below:

In the Claims

In Column 16, Line 57, in Claim 14, after "security", insert --system--

In Column 17, Line 8, in Claim 17, before "device.", insert --the--

Signed and Sealed this
Twenty-first Day of July, 2020

Andrei Iancu
*Director of the United States Patent and Trademark Office*